US009292922B2

(12) United States Patent
Facchin et al.

(10) Patent No.: US 9,292,922 B2
(45) Date of Patent: Mar. 22, 2016

(54) POINT CLOUD ASSISTED PHOTOGRAMMETRIC RENDERING METHOD AND APPARATUS

(75) Inventors: Aldo Facchin, Azzano Decimo (IT); Mario Nadalin, San Vito al Tagliamento (IT)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 13/266,313

(22) PCT Filed: May 26, 2010

(86) PCT No.: PCT/EP2010/057226
§ 371 (c)(1),
(2), (4) Date: Dec. 2, 2011

(87) PCT Pub. No.: WO2010/136479
PCT Pub. Date: Dec. 2, 2010

(65) Prior Publication Data
US 2012/0069012 A1    Mar. 22, 2012

(30) Foreign Application Priority Data

May 28, 2009    (IT) .............................. MI2009A0941

(51) Int. Cl.
*G06T 7/00*    (2006.01)
*G01C 11/02*    (2006.01)
*G06T 19/00*    (2011.01)
(52) U.S. Cl.
CPC .............. *G06T 7/0024* (2013.01); *G01C 11/02* (2013.01); *G06T 7/0075* (2013.01); *G06T 19/00* (2013.01); *G06T 2219/028* (2013.01)

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS 5,886,702 A * 3/1999 Migdal et al. ................. 345/423
7,317,456 B1 * 1/2008 Lee .............................. 345/427
(Continued)

FOREIGN PATENT DOCUMENTS

DE         19746639      5/1999
EP         1 505 547     2/2005

OTHER PUBLICATIONS

McCarthy, T., et al. "Integration of LIDAR and stereoscopic imagery for route corridor surveying." Mobile Mapping Technology 2007.*
St-Onge, B., and C. Véga. "Combining stereo-photogrammetry and lidar to map forest canopy height." (2003).*
(Continued)

*Primary Examiner* — Daniel Hajnik
(74) *Attorney, Agent, or Firm* — Sunstein Kann Murphy & Timbers LLP

(57) ABSTRACT

A point cloud assisted photogrammetric restitution method is described. Said method comprises:
 the simultaneous visualization on a screen (5) of the ensemble of a stereoscopic image (33) and a point cloud (34) acquired on a given area (2), said stereoscopic image deriving from at least a couple of photogrammetric images (11) acquired on said given area (2) and oriented according to the same coordinate system of the point cloud,
 the real time connection of the collimation mark (S) of the stereoscopic image with the corresponding collimation mark (S') of the point cloud.

10 Claims, 4 Drawing Sheets

(56) References Cited

U.S. PATENT DOCUMENTS

| | | | |
|---|---|---|---|
| 8,139,863 B1* | 3/2012 | Hsu | 382/190 |
| 2002/0060784 A1 | 5/2002 | Pack | |
| 2007/0024620 A1* | 2/2007 | Muller-Fischer et al. | 345/427 |
| 2007/0211077 A1* | 9/2007 | Voribiov et al. | 345/606 |
| 2008/0075326 A1* | 3/2008 | Otani et al. | 382/106 |
| 2010/0033429 A1* | 2/2010 | Olivan Bescos | 345/157 |
| 2010/0268067 A1* | 10/2010 | Razzaque et al. | 600/424 |

OTHER PUBLICATIONS

McCarthy et al., "Integration of dynamic LiDAR and image sensor data for route corridor mapping," The International Archives of the Photogrammetry, Remove Sensing and Spatial Information Sciences, vol. XXXVII, Part B5, pp. 1125-1130, Beijing 2008.

Canadian Intellectual Property Office, Office Action pertaining to Application No. 2,760,006, dated Nov. 30, 2015, 4 pages.

* cited by examiner

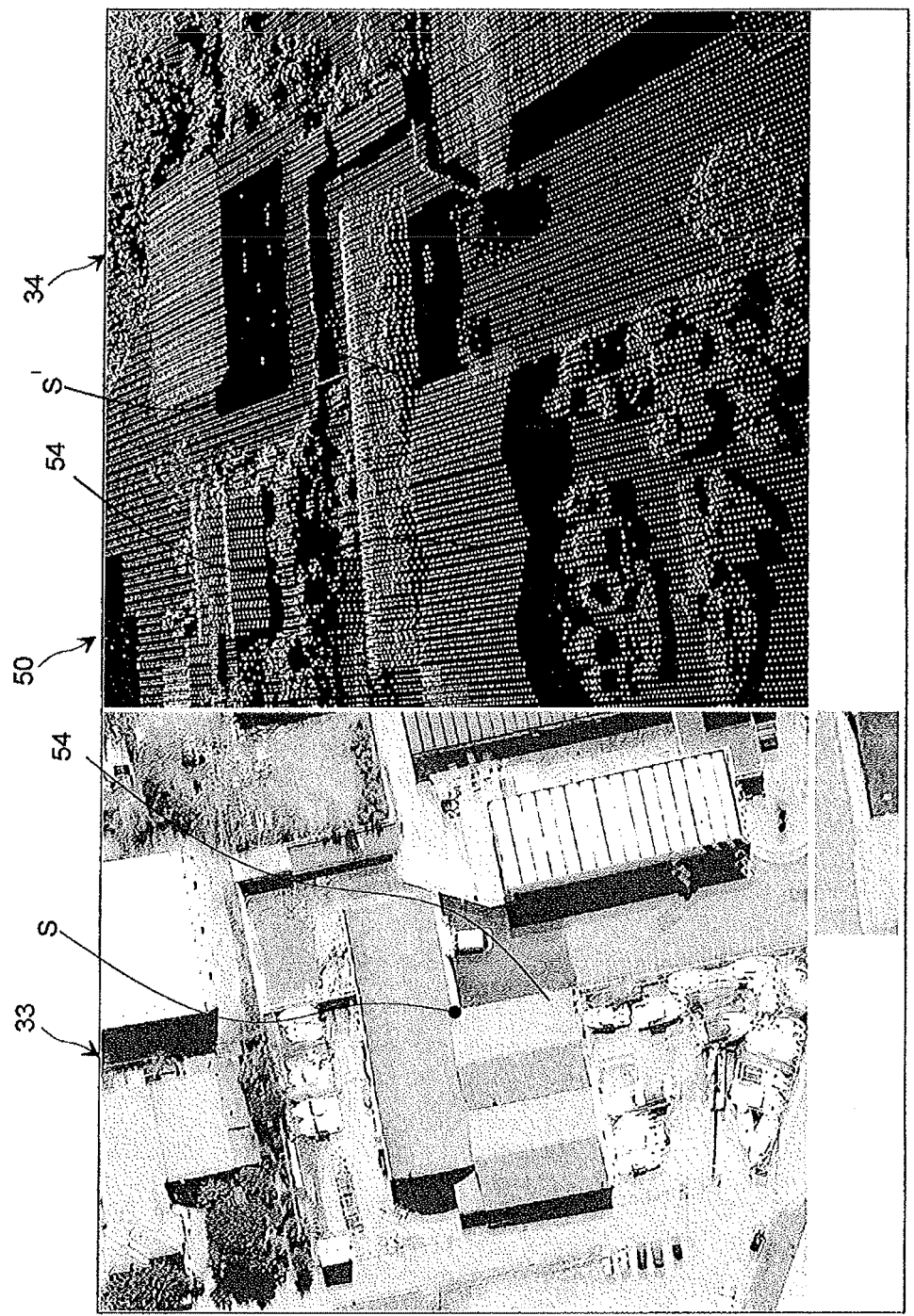

POINT CLOUD ASSISTED PHOTOGRAMMETRIC RENDERING METHOD AND APPARATUS

This is a national stage of PCT/EP10/057226 filed May 26, 2010 and published in English, which claims the priority of Italian number MI2009A 000941 filed May 28, 2009, hereby incorporated by reference.

The present invention relates to a point cloud assisted photogrammetric restitution (or plotting) method and apparatus thereof.

The use of photogrammetry, e.g. for the production of topographic maps, is known in the prior art.

Stereoscopic observation of pairs of images is normally used in photogrammetry. Said images are digital images, i.e. acquired digitally or acquired in analogue manner and then digitalized, the inner orientation features (i.e. the focus point, the main point and the distortion parameters) and the outer orientation features (e.g. the image shot centre and the absolute orientation angles for perspective shots) of which are known. By stereoscopically observing the images, the plotter operator performs a three-dimensional digital vectoring of the details to be plotted (e.g. road curb lines, building identification lines, reference points, etc.). In practice, identified lines are extracted by means of point sequences and single points, the coordinates of which are three-dimensional. For example, if the object is the roof of a house, the plotter operator extracts a continuous line according to given rules, which line describes the dimensions of the roof, in which the vertex coordinates (the Cartesian coordinates X, Y and Z) are determined according to the orientation of the images.

Photogrammetry is also used in land and industrial, not only aerial, contexts.

Figure 1:
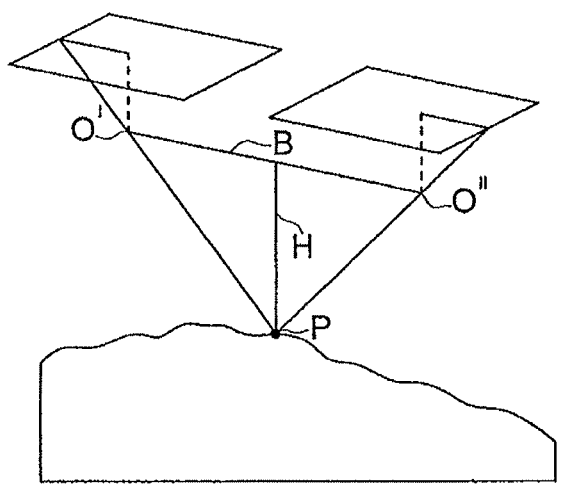

A critical aspect of photogrammetry is the detail with which the depth (typically the Z coordinate) of an object is determined; it depends on the B/H (base/height) ratio, where B is the distance between image centers O' and O'', commonly known as image base, and H is the distance between the image base and the object P, as shown in FIG. 1. In particular, the image base is the distance which separates the two image centers, which are the points in space in which the two photographs of a stereoscopic image are taken. The height H is the average height between the image base B and the framed surface; in the aerial case, H is the relative flying height, i.e. the difference between the flying height and the average height of terrain in that zone In light of the prior art, it is the object of the present invention to provide a method in which photogrammetric restitution is point cloud assisted to allow a more complete visualization of the area.

In accordance with the present invention, said object is reached by means of a point cloud assisted photogrammetric restitution method, said method comprising:

the simultaneous visualization on a screen of the ensemble of a stereoscopic image and a point cloud acquired on a given area, said stereoscopic image deriving from at least a couple of photogrammetric images acquired on said given area and oriented according to the same coordinate system of the point cloud, the real time connection of the collimation mark of the stereoscopic image with the corresponding collimation mark of the point cloud.

In a preferred embodiment, the method according to the present invention also allows a more accurate, rapid determination of the depth (Z coordinates) of the collimated points.

Again in accordance with the present invention, a point cloud assisted photogrammetric restitution method is provided, as defined in claim 9.

By virtue of the present invention, a method is provided for easily determining misalignments between objects of the stereoscopic image and the point cloud.

Figure 2:
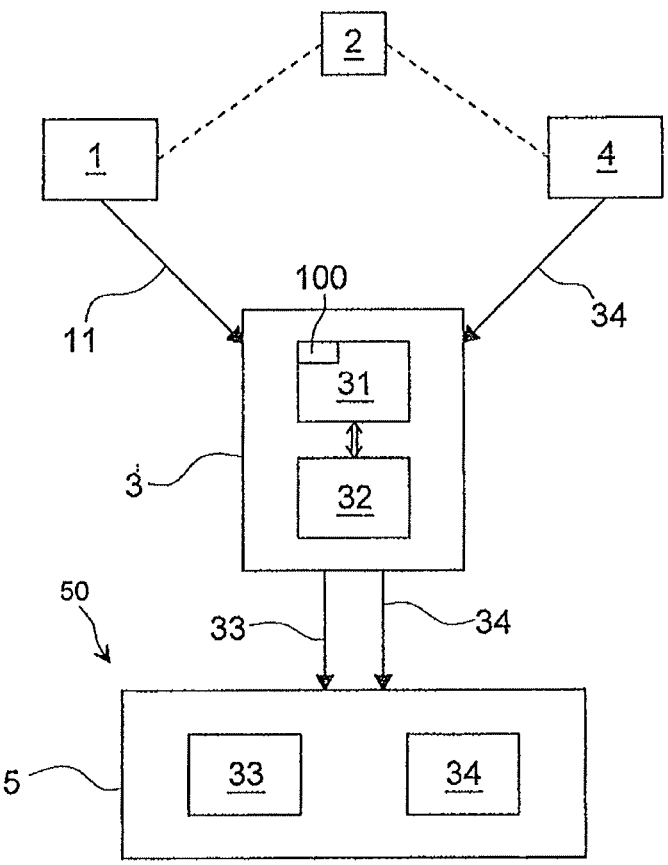
Figure 4:
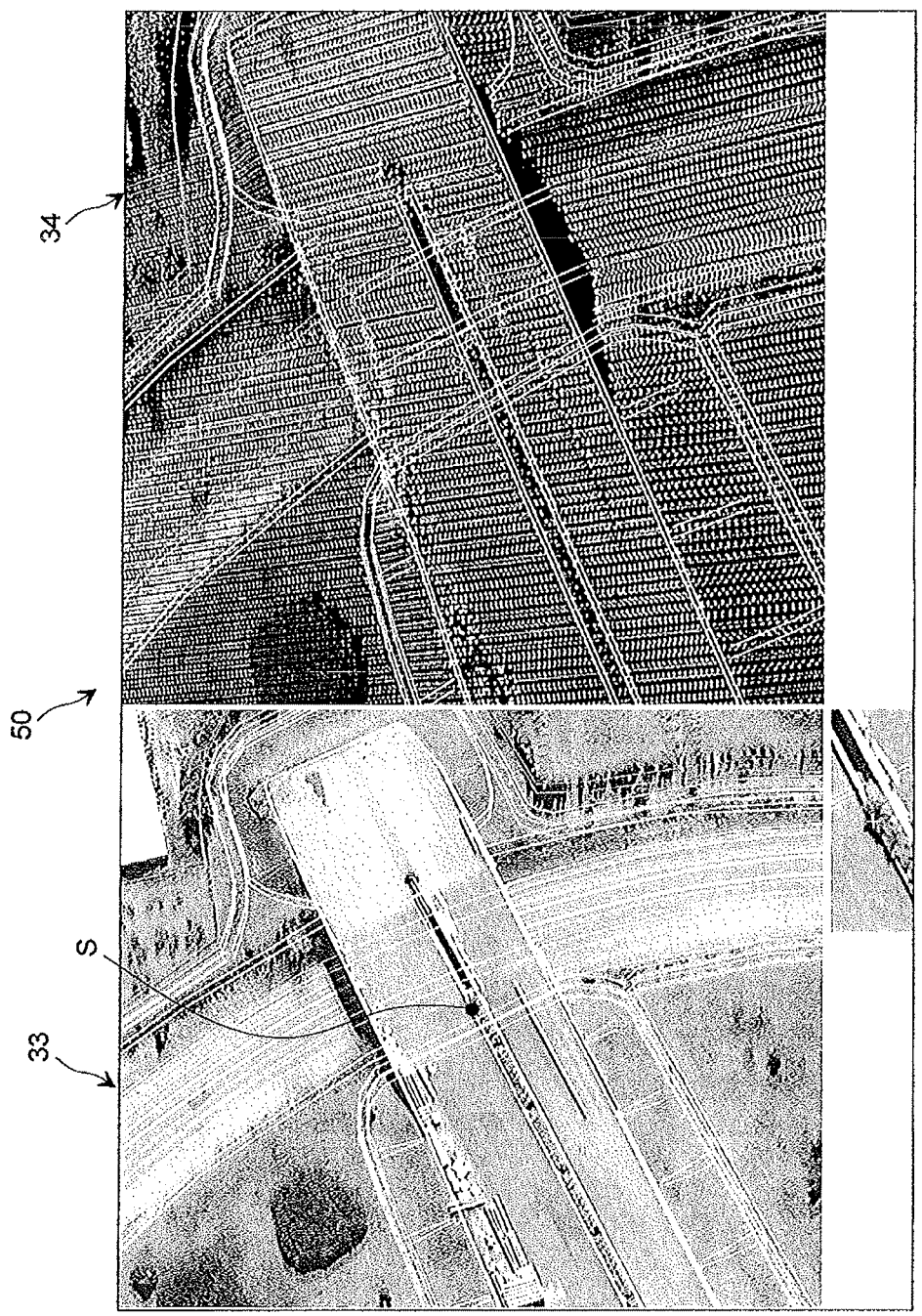
Figure 5:
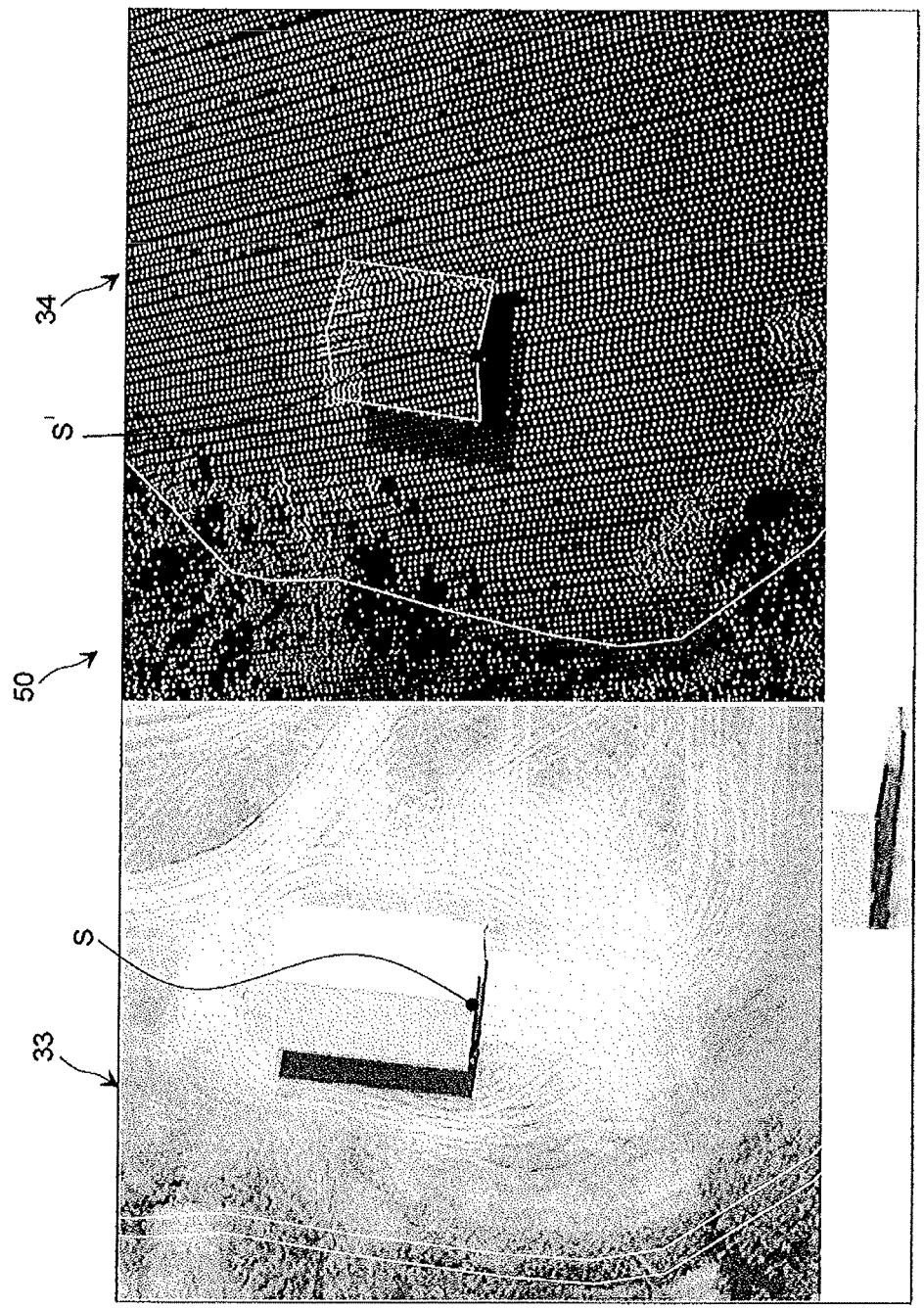

The features and the advantages of the present invention will be apparent from the following detailed description of a practical embodiment thereof, shown by way of non-limitative example in the accompanying drawings, in which:

FIG. 1 diagrammatically shows the arrangement of sensing means in an area for acquiring images useful for the formation of the stereoscopic image;

FIG. 2 is a block chart of the apparatus for the production of point cloud assisted stereoscopic images according to the present invention, FIGS. 3-5 show images which are obtained with the method according to the invention.

FIG. 2 shows a block chart of the point cloud assisted photogrammetric restitution apparatus according to the present invention. The apparatus comprises computerized means 3 comprising a memory 31, in which a software program 100 is installed, a microprocessor 32 and a screen 5; the software program 100 is capable of implementing a point cloud assisted photogrammetric restitution method.

The method comprises the simultaneous visualization on a screen 5 of the ensemble 50 of a stereoscopic image 33 and a point cloud 34 acquired on a given area 2. The stereoscopic image derives from at least a pair of photogrammetric images 11 acquired on said given area 2 and oriented according to the same coordinate system as the point cloud. The method comprises the real time connection of the collimation mark of the stereoscopic image 33 with the corresponding collimation mark of the point cloud 34.

The stereoscopic image derives from at least one pair of photogrammetric images 11 acquired on the area 2. The images 11 are obtained by means of sensing means 1 adapted to shoot the zone or areas 2 and are digital images; the images 11 may also be analogue images which are digitalized.

The device 3 comprises a memory 31, in which a software application 100 is installed and runs; said memory communicates with a microprocessor 32. The means 3 may also process images 11 to obtain a stereoscopic image 33.

The point cloud 34 is preferably obtained by means of a laser scanner 4 with LiDAR remote sensing technique, adapted to point the same zone 2; the point cloud 34 is an ensemble of points defined in three-dimensional coordinates of the zone 2. The acquisition of the images 11 and of the point cloud 34 may occur at the same time or in sequence after one another.

The point cloud 34 is oriented in a given manner on a coordinate system, e.g. on a Cartesian coordinate system X, Y and Z, and the images 11 must be oriented in the same coordinate system. Said stereoscopic image 33 is therefore aligned with the point cloud 34.

The software application 100 allows to visualize the ensemble 50 of the stereoscopic image 33 and of the point cloud 34 on a display 5; FIG. 3 shows the ensemble of a stereoscopic image 33 of a landscape with a house 54 combined with the point cloud 34.

The software application 100 allows the real time connection of the collimation mark S of the stereoscopic image 33 with the corresponding collimation mark S' of the point cloud 34. The collimation mark is the point either indicated or pointed by a pointer which can run on the image 33 and on the point cloud 34, e.g. a cursor. The collimation mark S of the stereoscopic image 33 is coupled with the collimation mark S' of the point cloud 34 so that all movements on the axes X, Y and Z of the collimation mark S on the stereoscopic image 33 cause a equal movement of the collimation mark S' of the point cloud 34. The lines and points created by the user, which describe the geometry of the objects to be acquired (e.g. the roofs of the buildings in FIG. 3), can be visualized on the stereoscopic image 33 and on the point cloud 34 in order to evaluate acquisition accuracy with regards to the stereoscopic image and the point cloud. By means of the combined view of the stereoscopic image 33 and the point cloud 34, misalignments between the images can be verified and the quality of the acquisition for both the stereoscopic image and the point cloud can be measured.

The method in accordance with the invention comprises calculating in real time the depth or Z coordinate of the collimation mark S of the stereoscopic image 33 according to the obtained depth of the point cloud 34.

In this manner, the three-dimensional coordinates of the collimation mark S are immediately acquired because the software itself obtains the coordinates X and Y, i.e. the planar coordinates of the collimation mark S, from the stereoscopic image 33, while the depth or in this case the coordinate Z, is automatically acquired from the point cloud 34. For example, if the collimation mark S is on the vertex of a roof of a building 54, the planar coordinates will be given by the stereoscopic image 33 but the depth Z will be obtained automatically by the point cloud 34.

Depth Z may be calculated by means of various algorithms.

A first algorithm is used to calculate depth Z by searching the point cloud which is closest to the position of the collimation mark S' within a given distance chosen by the user.

With another algorithm, alternative to the first, the software 100 may plot a depth Z calculated on an averaging plane interpolating the points of the point cloud 34 which are closer to the position of the collimation mark S' within a given distance, again chosen by the user on a case-by-case basis.

With a third algorithm, alternative to the preceding ones, the software program 100 may plot a depth Z calculated according to the weighted average of the Z coordinates of the points of the point cloud which are within a given distance from the collimation mark S', with weight equal to the inverse of the distance, which is again chosen by the user.

If the cloud points are classified according to the type of point (e.g. land, vegetation, artificial works, etc.), the user can select which classes to be included in the search and which are to be excluded.

For each algorithm, the point search within a given distance from the collimation mark S' may be two-dimensional (when only the planar coordinates X, Y of the collimation mark S' and of the cloud points are considered to calculate the distance) or three-dimensional (when the planar coordinates and the depth, i.e. the current X, Y, Z coordinates of the collimation mark S' and the coordinates X, Y, Z of the cloud points are considered for calculating the distance).

In all cases, if the depth Z calculated in this manner is deemed not correct, the operator can always deactivate the function and manually determine the position, based on the stereoscopic vision of the image 33.

Thus, the normal conditions, the operator simply needs to move the collimation mark S on the image 33 and the software program 100 plots the depth Z of the position of the collimation mark S in real time, according to the point cloud, on the basis of the set capture parameters (the search radius and the possible excluded point classes) and the set search algorithm.

The method according to the present invention allows easy interpretation of images details combined with accurate depth determined by the point cloud.

The point cloud 34 may also be stereoscopically visualized by using a pair of prospective projections, which have a given mutual parallax, as shown in FIG. 4.

The acquisition with combined view is must faster and more expedite than traditional photogrammetric acquisition, in which the operator must manually determine the depth of the point and perceive that the collimation mark rests on the surface.

Furthermore, it is much more accurate and reliable, because the depth Z is given by the point cloud and the accuracy of this data does not depend on the ratio between height H and image base B and on the operator's ability in defining the position of the depth Z of the cursor.

Finally, there is a much greater detail perception with respect to the use of the point cloud only.

Furthermore, by having a stereoscopic view, the operator perceives in all cases the three-dimensional shape of the object being traced, therefore a possible accidental error, e.g. in capturing the point cloud depth Z, may be easily diagnosed and eliminated from the start.

The dimension of the image 33 and of the point cloud 34 on the screen may be varied at will. With regards to the point cloud 34, the user can modify the parallax and the field of view (FOV) to either emphasize the stereoscopic effect or reduce it to zero and can select all point classes to be visualized (in the case of points which also have the classification attribute). Both the stereoscopic image 33 and the point cloud 34 can display the lines and points created by the user, which describe the geometry of the acquired objects (e.g. in FIG. 4, the street curbs), in order to evaluate the acquisition accuracy in both cases (i.e. in relation to the stereoscopic image formed by the images and in relation to the point cloud). The movements of the three-dimensional cursor which modify the scene in image 33 cause a corresponding change in the scene of the point cloud 34 so that they are coupled from the view point of the framed detail.

In order to better understand details (e.g. the shape of a roof), the user may represent the cloud points 34 with staggered scales (emphasizing the depth Z) and may turn the scene of the point cloud 34 at will.

Typically, however, the depth accuracy of the point cloud is much higher than what can be obtained with image pair due to the B/H ratio values (described above) which is used in photogrammetric images.

Therefore, in normal cases, in some cases very obvious differences of level of the point cloud 34 cannot be evaluated by the stereoscopic model formed by the images. This problem is overcome by this technique.

The fact of not needing to manually set the cursor position by stereoscopically observing the model formed by the images makes this technique much more expedite than the classic photogrammetric technique.

The normal sensing conditions (photogrammetric and lidar) make this technique also much more accurate in evaluating the depth than the classic photogrammetric technique.

On the other hand, the point cloud alone is not sufficient to correctly describe given details (such as for example the edge of a building) as may be easily done instead with the stereoscopic image.

The combined view allows in all case human control by the operator, who may validate the result and/or modify it.

FIG. 5 shows an overview of this technique used to acquire the shape of the roof of the building. The two zoom levels of the stereoscopic image 33 with different rotation angle of the point cloud 34 help to appreciate the geometric quality of the acquired eaves line.

The invention claimed is:

1. A point cloud assisted photogrammetric restitution method, said method comprising:
the simultaneous visualization on a screen of the ensemble of a stereoscopic image and a point cloud acquired on a given area, said stereoscopic image deriving from at least a couple of photogrammetric images acquired on said given area and oriented according to the same coordinate system of the point cloud,
the real time connection of the collimation mark of the stereoscopic image with the corresponding collimation mark of the point cloud, said collimation mark being the point either indicated or pointed by a cursor or a pointer which can run on the image and on the point cloud, wherein the real time connection of the collimation mark of the stereoscopic image with the corresponding collimation mark of the point cloud is such that movements of one collimation mark cause an equal movement of the other collimation mark.

2. The method according to claim 1, characterized in that it comprises the calculation in real time of the depth of the collimation mark of the stereoscopic image based on the depth obtained by the point cloud.

3. The method according to claim 2, characterized in that said calculation provides the depth of the point of the point cloud that is nearer to the collimation mark within a determined distance.

4. The method according to claim 2, characterized in that said depth is calculated on a averaging plane interpolating the points of the point cloud which are closer to the collimation mark within a determined distance.

5. The method according to claim 2, characterized in that said depth is calculated on the base of the weighted average of the depths of the points of the point cloud which find themselves within a certain distance of the collimation mark with weight equal to the inverse of the distance.

6. The method according to claim 3, characterized in that said research of said at least one point of said point cloud that finds itself within a determined distance from the collimation mark occurs in a bidimensional way considering only the planar coordinates of said at least one point.

7. The method according to claim 3, characterized in that said research of said at least one point of said point cloud that finds itself within a determined distance of the collimation mark occurs in a tridimensional way considering the planar coordinates and the depth of said at least one point.

8. The method according to claim 1, characterized in that it comprises the formation of a stereoscopic image of the point cloud by means of the setting of a couple of perspective projections having a certain parallax between them.

9. A point cloud assisted photogrammetric restitution apparatus, said apparatus comprising informatic means comprising a memory wherein a software is installed and a microprocessor and a screen, said software being able to implement a point cloud assisted photogrammetric restitution method as defined in any one of the preceding claims.

10. The apparatus according to claim 9, characterized in that said point cloud is produced by a laser scanner with lidar remote sensing technique.

* * * * *